United States Patent [19]

Debuysscher et al.

[11] Patent Number: 4,553,233

[45] Date of Patent: Nov. 12, 1985

[54] MULTIPLE-RING COMMUNICATION SYSTEM

[75] Inventors: Pierre L. Debuysscher, Nazareth; Hugo J. P. Peeters, Brasschaat; Christiaan G. M. M. Hennebel, Mortsel, all of Belgium

[73] Assignee: International Standard Electric Corporation, New York, N.Y.

[21] Appl. No.: 562,133

[22] Filed: Dec. 16, 1983

[30] Foreign Application Priority Data

Dec. 22, 1982 [BE] Belgium ............................ 2/59974

[51] Int. Cl.⁴ ............................ H04J 1/16; H04J 3/14
[52] U.S. Cl. .............................................. 370/16; 370/88
[58] Field of Search ................ 370/86, 87, 88, 37, 370/14, 15, 16

[56] References Cited

U.S. PATENT DOCUMENTS

| | | | |
|---|---|---|---|
| 4,048,446 | 9/1977 | Hafner et al. | 370/16 |
| 4,144,410 | 3/1979 | Flickinger et al. | 370/88 |
| 4,370,744 | 1/1983 | Hirano et al. | 370/88 |
| 4,380,061 | 4/1983 | Mori et al. | 370/88 |
| 4,460,994 | 7/1984 | Scanlon et al. | 370/88 |

OTHER PUBLICATIONS

Patent Abstracts of Japan, "Loop Data Transmission System"; Manoru; Mar. 3, 1977.
Telephone Engineer and Management, vol. 84, No. 15; Walker; "Digital Loop Protection Applications; Aug. 1, 1, 1980; pp. 65–67.

Primary Examiner—Douglas W. Olms
Assistant Examiner—Frank M. Scutch, III
Attorney, Agent, or Firm—John T. O'Halloran; Thomas F. Meagher

[57] ABSTRACT

A multiple-ring communication system is disclosed wherein each node of the system is adapted to collect information on the status of the system. Receiver/transmitter equipments of each of the nodes are able to transmit ring test messages on the rings, the destinations of which are the node itself. Processing equipments control the receiver/transmitter equipments of the node and are able to check the receipt or absence of receipt of the ring test messages prior to possibly executing reconfiguration operations. Receiver/transmitter equipments of each of the nodes are also able to transmit neighboring node test messages on the rings, which upon receipt by the receiver/transmitter equipments of the neighboring nodes normally give rise to the transmission to the node of node test reply messages on rings different from those on which the neighboring node test messages were transmitted. The node processing equipments are also able to check the receipt or absence of receipt of the node test reply messages prior to possibly executing reconfiguration operations.

18 Claims, 2 Drawing Figures

MULTIPLE-RING COMMUNICATION SYSTEM

BACKGROUND OF THE INVENTION

1. Field of the Invention

The present invention relates to a multiple-ring communication system which includes a plurality of nodes intercoupled in at least two rings and operating on an equal basis without central control, each node including a plurality of message receiver/transmitter equipments associated to distinct ones of said rings respectively and able to receive messages on said rings and transmit messages thereon in opposite directions, and processing means for checking the receipt or absence of receipt of signals on the receiver ring portions connecting the receivers of said node to transmitters of its neighbouring nodes and for performing reconfiguration operations in response to the result provided by said checking operation.

2. Description of Related Art

Such a system is already known from the article "A distributed double-loop computer network (DDLCN)" by J. J. Wolf and M. T. Liu, published on pages 6-19 to 6-34 of the Proceedings of the Seventh Texas Conference on Computing Systems, held in Houston, Oct. 30-Nov. 1, 1978.

In order to have a maximum number of nodes always able to communicate with each other, even when there is some fault in the system, it is necessary to test the condition of the system almost continuously and in case an error is detected to take immediately the necessary reconfiguration measures to restore the faulty system back to an operative status. Such a reconfiguration measure consists for instance in case of an interruption for both rings, in transforming the double ring system into a single ring system by establishing two interconnections between these rings.

In the above mentioned known system each node transmits to its neighbouring nodes timing signals as long as it is not transmitting messages, so that each node receives such timing signals substantially in a continuous way on the receiver ring portions by means of which its receivers are coupled to the transmitters of the neighbouring nodes. Each node tests the condition of its neighbouring nodes by checking the receipt or absence of receipt of these timing signals. In this way very limited information is obtained at the testing node on the overall status of the system since this information only concerns the condition of the receiver ring portions, of the transmitters of the neighbouring nodes and of the own receivers. No information at all is obtained at this node on the condition, for instance of its own transmitters, of the receivers at the neighbouring nodes and of the transmission ring portions by means of which its transmitters are coupled to receivers at the neighbouring nodes. As a consequence, reconfiguration measures have to be taken by the processing means on the basis of very limited information on the system status and these measures can therefore be erroneous. For instance, it might be decided to establish two loops between the rings to form a single ring system although one of the rings is still fully operational.

An object of the present invention is to provide a multiple-ring communication system of the above type, but each node of which is adapted to collect more information on the status of the system.

SUMMARY OF THE INVENTION

According to the invention this object is achieved due to the fact that said receiver/transmitter equipments of each said node are able to transmit on said rings ring test messages the destination of which is said node itself, said processing means controlling said receiver/transmitter equipments of said node and being able to check the receipt or absence of receipt of said ring test messages prior to possibly executing said reconfiguration operations.

By checking the receipt or absence of receipt of the ring test messages information is obtained on the condition of all the nodes and of all the ring portions interconnecting these nodes. Thus each node always knows if one or both rings are operating correctly or not and if loops have been established between these rings or not.

Another characteristic feature of the present system is that said receiver/transmitter equipments of each said node are also able to transmit on said rings neighbouring node test messages which upon receipt by receiver/transmitter equipments of said neighbouring nodes normally give rise to the transmission to said node of node test reply messages on rings different from those on which said neighbouring node test messages were transmitted, said processing means being also able to check the receipt or absence of receipt of said test reply messages prior to possibly executing said reconfiguration operations.

By checking in each node the receipt or absence of receipt of the node test reply messages information is obtained therein on the condition of the receiver and transmitter ring portions connecting the transmitters and receivers of this node to the receivers and transmitters of the neighbouring nodes, of its own receivers and transmitters and of the receivers and transmitters of the neighbouring nodes.

With all this information available well founded decisions can be taken by the processing means.

BRIEF DESCRIPTION OF THE DRAWING

The above mentioned and other objects and features of the invention will become more apparent and the invention itself will be best understood by referring to the following description of embodiments taken in conjunction with the accompanying drawings wherein.

DESCRIPTION OF THE PREFERRED EMBODIMENT

Figure 1:
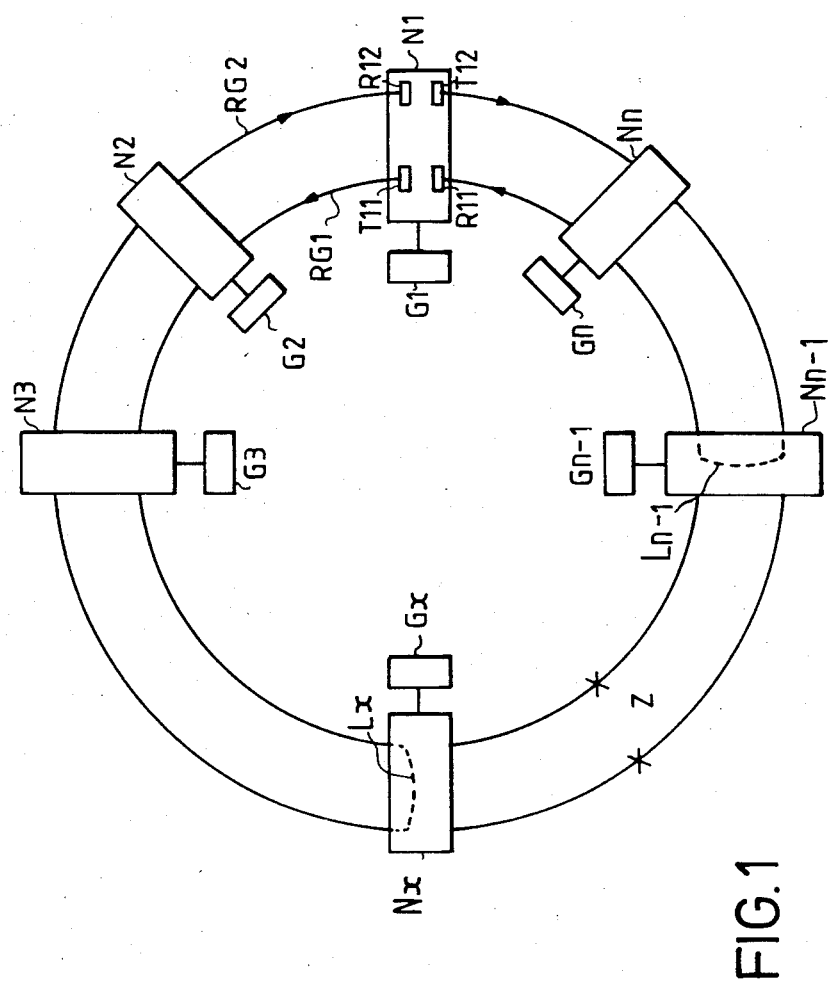
FIG. 1 shows a multiple-ring communication system according to the invention.

The multiple-ring communication system shown in FIG. 1 is more particularly a double-ring system which includes a plurality of stations or nodes N1 totaling Nn which are intercoupled so as to form two communication loops or rings RG1 and RG2 and which operate on an equal basis without central control. The system operates in a plesochronous way, meaning that each node is operating at the rhythm of its own clock but that the frequency difference between the clocks of all nodes is restricted to a predetermined value. Such a way of operation is generally known in the technique e.g. in packet switching networks. On the rings RG1 and RG2 messages are able to be transmitted in opposite directions as indicated by the arrows and in each node a message receiver and a message transmitter are connected to each of the rings, e.g. in N1, R11 and T11 are connected to RG1 and R12 and T12 are connected to RG2. The nodes N1 to Nn have access to groups of user terminal circuits G1 to Gn respectively.

Figure 2:
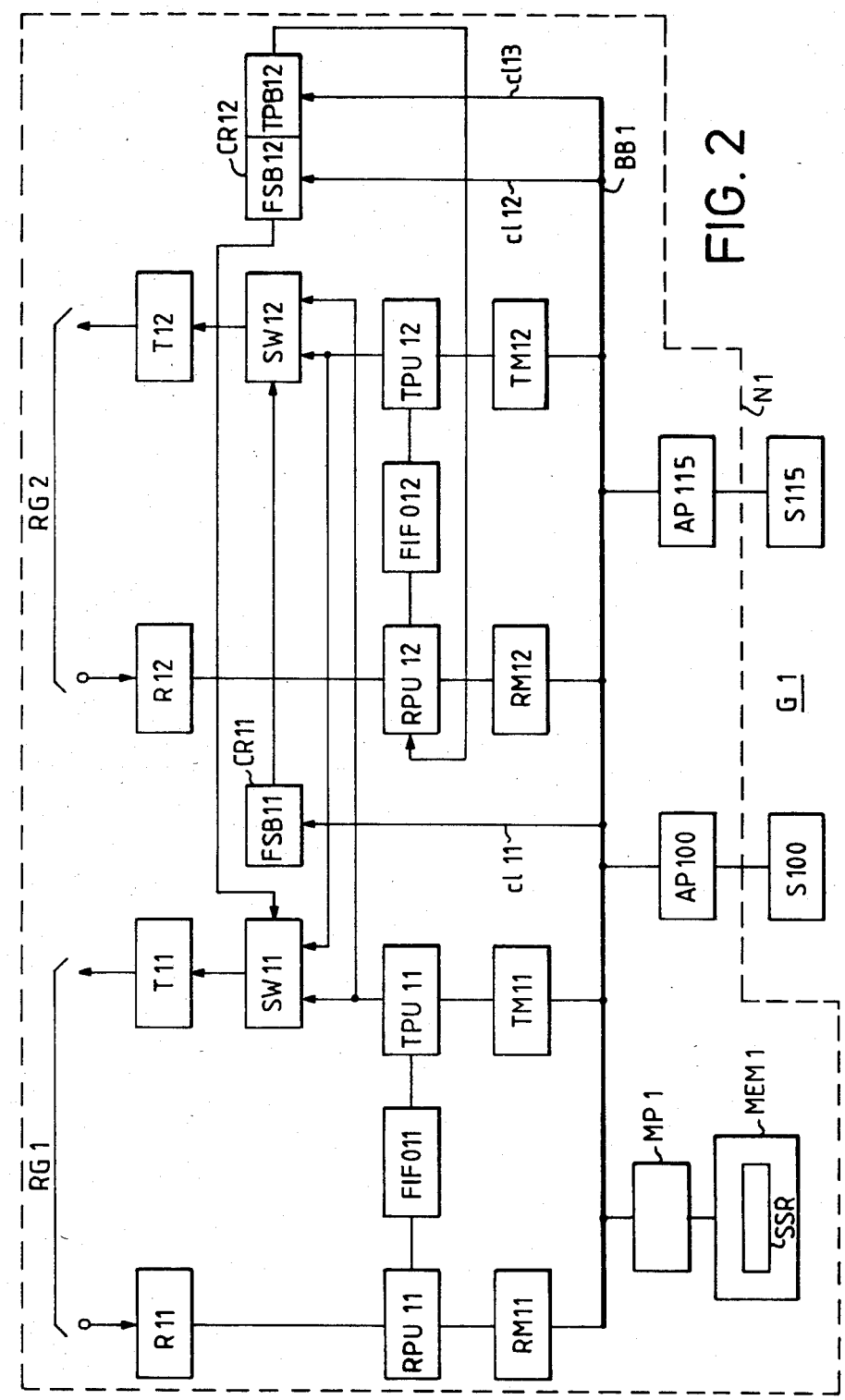
FIG. 2 represents a station or node N1 and associated user circuits G1 of FIG. 1 in more detail.

Node N1 represented in FIG. 2 is identical to all other nodes and includes equipment associated in common to both the rings RG1 and RG2 as well as equipment individually associated to each of these rings.

The common equipment of node N1 includes:

a main processor MP1, e.g. 8086 INTEL processor, having access to an individually associated memory MEM1 including a system status register SSR and to a common communication bus BB1;

16 auxiliary processors AP100 to AP115 having access to the common bus BB1 and to individually associated sets of user terminal circuits S100 to S115 respectively. These sets together form the above mentioned group G1.

The equipment of node N1 individually associated to ring RG1 includes;

a receiver R11 and a transmitter T11 both connected to RG1;

a receiver processing unit RPU11 directly coupled to receiver R11 and a transmitter processing unit TPU11 coupled to transmitter T11 via a change-over switch SW11 which will be considered later;

a delay buffer constituted by a first-in-first-out or FIFO circuit FIFO11 coupling RPU11 to TPU11;

an input buffer or receiver memory RM11 and an output buffer or transmitter memory TM11 coupled on the one hand to RPU11 and TPU11 respectively and on the other hand to the common bus BB1;

a control register CR11 coupled to the latter bus BB1 via control lead c111 and storing a so-called "faulty side bit" FSB11. This bit is 0 or 1 depending on N1 at the side looking in the direction of RG1 (FIG. 1) being not faulty or faulty respectively. This side includes portions of RG1 and RG2 and node N2.

Likewise, the equipment individually associated to ring RG2 includes a receiver R12, a transmitter T12, a receiver processing unit RPU12, a transmitter processing unit TPU12; a change-over switch SW12, a delay buffer or FIFO circuit FIDO2; an input buffer or receiver memory RM12, an output buffer or transmitter memory TM12 and a control register CR12 coupled to bus BB1 via control leads c112 and c113 and storing not only a malicious side bit FSB12 but also a socalled transparency bit TPB12. All these circuits are interconnected in the same way as the corresponding circuits of the equipment individually associated to RG1. FSB12 is 0 or 1 depending on the side of N2 looking in the direction of RG2 (FIG. 1) being not faulty or faulty respectively. This side includes portions of RG1 and RG2 and node Nn. Transparency bit TPB12 is associated to ring RG2 i.e. to RPU12 and is 1 or 0 depending on N1 being transparent or not respectively with respect to RG2 as will be explained later.

Change-over switch SW11 enables either TPU11 or TPU12 to be connected to T11 and change-over switch SW12 likewise enables either TPU11 or TPU12 to be connected to T12. Each of these switches SW11 and SW12 is in fact a well known 2-input-1-output digital multiplexer further having a select input. The select inputs of these multiplexers are controlled by FSB12 and FSB11 stored in the control registers CR12 and CR11 respectively. Depending on FSB12 being 0 or 1, the output of TPU11 or TPU12 is connected to T11 and depending on FSB11 being 0 or 1, the output of TPU12 or TPU11 is connected to T12. In other words, when FSB12 (FSB11) is 0 or 1, receiver R12 (R11) is coupled to transmitter T12 (T11) or T11 (T12) respectively, thus establishing a loop between RG2 (RG1) and RG1 (RG2).

Functions of the main processor MP1 are, amongst others, to collect via the bus BB1 messages transmitted by RM11, RM12 and the auxiliary processors AP100–AP115, to process these messages, to form new messages and store them via bus BB1 in TM11 or TM12 for subsequent transmission to another node, to set or reset the bits FSB11, FSB12, TMB12 via BB1 and c111, c112, c113 respectively, to transmit messages to the auxiliary processors via BB1, and to perform time-outs.

The auxiliary processors AP100–AP115 are able, for instance, to process messages incoming from MP1 via BB1 and from the associated sets of user terminal circuits S100–S115. They also can transmit messages to MP1 and to S100–S115.

The receiver processing circuits RPU11 and RPU12 are able to execute relatively simple functions such as processing the messages received in R11, R12 on RG1, RG2 and storing them either in RM11, RM12 (thus removing them from the ring) or in FIFO11, FIFO12 (for transmission to another node) depending on the type of message. In this connection it should be noted that a message can only be removed from the ring by the originating node and by the destination node.

Also, the transmitter processing units TPU11 and TPU12 are able to execute relatively simple functions such as processing the messages stored in TM11, TM12 or in FIFO11, FIFO12 and operating T11, T12 or T12, T11, depending on the condition of FSB11, FSB12, in order to transmit these messages on RG1, RG2 or RG2, RG1.

The messages used in the present system for testing it are the following:

ring test messages which are intended for testing the ring RG1 and RG2. They are transmitted in each node on RG1 and RG2 and removed from the ring when received back in this node. If everything is o.k. this happens after the message has passed through all the other nodes via RG1 or RG2. It is clear that when a ring test message is received back in a node this is an indication that the receiver/transmitter equipments, associated to this ring, of all the nodes operate correctly and that the portions of the ring interconnecting these nodes are not faulty;

adjacent-node test messages which are intended mainly for testing the adjacent nodes of each node. They are transmitted in each node on RG1 or RG2;

adjacent-node test reply messages which are also mainly intended for testing the adjacent nodes of a node as they are transmitted from these adjacent nodes to the latter node in reply to adjacent-node test messages. This transmission is performed on rings different from those on which the adjacent-node test messages were received by the node. Hence, when an adjacent node test reply message is received in a node from an adjacent node this is an indication that the receiver/transmitter equipments involved in the operation of both nodes and the ring portions interconnecting these nodes are not faulty.

In what follows the adjacent-node test and the adjacent-node test reply messages are called node test and node test reply messages for simplicity reasons.

More particularly, the equipment of node N1 is able to transmit two ring test messages RTM11 (message from N1 on RG1) and RTM12 (message from N1 on RG2) and two node test messages NTM11 (message from N1 on RG1) and NTM12 (message from N1 on RG2) and to receive from the adjacent nodes N2 and Nn in reply to these node test messages two node test reply messages NTRM22 (message from N2 on RG2) and NTRMn1 (message from Nn on RG1). Obviously the node N1 is also able to transmit node test reply messages NTRM11 and NTRM12 to N2 and Nn respectively, but this is without importance for the further description.

The above test messages may contain:
a message type indication;
a source node address;
a destination node address;
a ring identifier for identifying the ring on which the message is transmitted;
information related to the message type, e.g. an indication that upon the message being received on a ring a reply message should be transmitted on the other ring. If there are more than two rings the identity of this other ring should be given.

The ring test messages RTM11 and RTM12 contain the following information:
the message type indication: RTM;
the source node address: N1;
the destination node address: N1;
ring identifier; RG1 and RG2 respectively.

The node test messages NTM11 and NTM12 contain the following information:
message type indication: NTM;
source node address: N1;
ring identifier: RG1 and RG2 respectively;
information for the main processor indicating that upon the receipt of the message by a node on a ring a reply message should be transmitted on the other ring to the source node of the message. The information can also contain an indication that upon the receipt of the message a test programme should be started and that a reply message should be transmitted to the source node of the test message on the other ring only when the test was successful. To be noted that the node test message does not contain a destination address, i.e. the address of an adjacent node. In this way, each node can be perfectly ignorant of the structure of the ring and more particularly has not to know the identity of its neighbouring nodes. Thus the structure of the ring can be modified without it being necessary to adapt the messages.

The node test reply messages NTRM22 and NTRMn1 contain the following information:
the message type indication: NTRM;
the source node address: N2 and Nn respectively;
the destination node address: N1;
the ring identifier: RG2 and RG1 respectively.

In brief, the above system operates as follows:
each message and hence each of the test messages RTM11, NTRMn1 (RTM12, NTRM22) received by R11 (R12) is processed by RPU11 (RPU12) and stored in RM11 (RM12) or in FIFO11 (FIFO12) depending on the message being intended for node N1 or for another node respectively;

a received message which has been stored in RM11 (RM12) is processed by MP1 and possibly transmitted to an auxiliary processor AP100-AP115 where it is further processed and possibly sent from there to one of the user terminal circuits of the associated set S100-S1115 respectively;

a received message which has been stored in FIFO11 (FIFO12) is processed by TPU11 and transmitted on RG1 (RG2) by transmitter T11 (T12) if FSB12 (FSB11) is 0. However, if FSB12 (FSB11) is 1 this message is transmitted on RG2 (RG1) by transmitter T12 (T11);

a message which has been locally formed by MP1 and has to be transmitted to another node, such as the test messages RTM11, RTM12, NTM11, NTM12, is stored by MP1 either in TM11 or in TM12 and then handled by TPU11 or TPU12 in a similar way as the messages stored in FIFO11 and FIFO12.

From the nature of the above test messages it follows that in normal circumstances:
the ring test messages RTM11 and RTM12 test the following:
all the portions of RG1 and RG2 interconnecting the various nodes;
in N1 the two receiving/transmission equipments;
in the other nodes N2 to Nn the equipment corresponding to the following equipment in N1: R11, RPU11, FIFO11, TPU11, SW11, T11 and R12, RPU12, FIFO12, TPU12, SW12, T12;
the node test messages NTM11 and NTM12 test the following:
the portion of RG1 interconnecting N1 and N2 and the portion of RG2 interconnecting N1 and Nn;
in N1 the two transmission equipments;
in N2 and Nn the equipments corresponding to the following receiving equipments in N1: R11, RPU11, RM11, MP1, MEM1; and R12, RPU12, RM12, MP1, MEM1 rsspectively.
the node test reply messages NTRM22 and NTRMn1 test the following:
the portion of RG2 interconnecting N1 and N2 and the portion of RG1 interconnecting N1 and Nn;
in N2 and Nn the transmission equipment corresponding to the following transmission equipments in N1: MP1, MEM1, TM12, TPU12, SW12, T12; and MP1, MEM1, TM11, TPU11, SW11, T11 respectively
in N1 the two receiving equipments.

Returning to the main processor MP1, the latter is more particularly able to control the following functions:
making an interconnection or loop between RG1 and RG2, i.e. between R11 and T12, by setting to 1 FSB11 which then controls SW12 in such a manner that TPU11 is connected to T12;
making a loop between RG2 and RG1, i.e. between R12 and T11, by setting to 1 FSB12 which then controls SW11 in such a way that TPU12 is connected to T11;
opening of a loop between RG1 and RG2 resetting FSB11 to 0;
opening of a loop between RG2 and RG1 by resetting FSB12 to 0;
making RG2 transparent by setting to 1 TPM 12 which controls RPU12;
removing transparency from RG2 by resetting TPB12 to 0;
transmitting messages to a maintenance system (not shown), e.g. to indicate that RG1 or RG2 is O.K. or faulty;
updating system status register SSR shown in columns 2 to 5 of the table on the last page of the description. SSR indicates the status of the system as seen in node N1. It more particularly has four successive locations for registering the reaction detected in node N1 to the transmission of RTM11, RTM12, NTM11 and NTM12 respectively. This reaction is one of the following codes:
(1) 00 or N: this means that no message has been received;
(2) 01 or RTM11, RTM12: this means that the ring test message RTM11, RTM12 has been received on ring RG1, RG2 respectively, i.e. by RM11, RM12;
(3) 10 or RTM'11, RTM'12: this means that ring test message RTM11, RTM12 has been received on ring RG2, RG1 respectively, i.e. by RM12, RM11;
(4) 11 or NTRM22, NTRMnm: this means that node test reply message RTM11, RTM12 has been received from N2, Nn respectively.

The codes 00 to 11 are not shown in the SSR.

Main processor MP1 alternately counts time intervals TO1 and TO2. During TO1 normal messages are transmitted and no tests are performed, whilst during TO2 only ring test messages RTM11 and RTM12 and node test messages NTM11 and NTM12 are transmitted. The receipt or absence of receipt of the ring test messages as well as of the node test reply messages NTRM22 and NTRMn1 is checked and their possible receipt is registered in the system status register SSR. In normal circumstances these test messages are received before the end of TO2 at which moment the processor MP1 evaluates the result of the tests by checking the contents of SSR. In function of this result the MP1 then decides to execute measures to reconfigure a faulty system back to a correctly operating system to inform a maintenance system (not shown), or to do nothing.

The operation of the above system is described in more detail hereinafter, it being supposed that in node N1 bits FSB11, FSB12 and TPB12 are 0. This means that TPU11 and TPU12 are connected to T11 and T12 via SW11 and SW12 respectively and that ring RG2 in N1 is not transparent.

After the end of a time interval TO1, the main processor MP1:
  resets the system status register SSR by writing in each of the 4 locations thereof the code N;
  starts counting time interval TO2;
  forms test messages RTM11, NTM11 and RTM12, NTM12 and stores them in TM11 and TM12 respectively together with an order of transmission.

The transmitter processing units TPU11 and TPU12 then first read the ring test messages RTM11 and RTM12 and operate T11 and T12 to transmit these messages on RG1 and RG2 respectively. Immediately afterwards and in an analogous way the node test messages NTM11 and NTM12 are read and transmitted on RG1 and RG2 respectively.

The ring test message RTM11 on RG1 is successively received and transmitted by the nodes N2 to Nn and finally received by node N1, and the ring test message RTM12 on RG2 is successively received and transmitted by the nodes Nn to N2 and finally received by N1.

More particularly, when a ring test message RTM11, RTM12 is received by a receiver of one of the nodes N2 to Nn the receiver processing unit associated to this receiver derives from the contents of the message that its destination is node N1 and therefore writes the ring test message in the associated FIFO. The processing unit associated to this FIFO starts reading it as soon as e.g. a byte of this message has been stored in the FIFO and then operates the associated transmitter to transmit it on the associated ring. The following bytes of the message are transmitted in the same way. However, when a ring test message RTM11, RTM12 is received by a receiver of node N1 the receiver processing unit associated to this receiver derives from the contents of the message that it is intended for node N1 and therefore stores it in its associated memory or input buffer. Thus the ring test message is removed from the ring.

The node test messages NTM11 and NTM12 transmitted on the rings RG1 and RG2 are received by the receivers associated to RG1 and RG2 of the neighbouring nodes N2 and Nn respectively. The receiver processing unit associated to each of these receivers derives from the contents of the message received that it is a node test message and therefore stores it in the associated memory or input buffer. Thus the node test message is removed from the ring. When each of the main processors of the nodes N2 and Nn afterwards reads the node test message from this memory it forms a node test reply message, NTRM22 and NTRMn1 respectively, and stores it in the transmitter memory associated to the ring, RG2 and RG1 respectively, for transmission on this ring. Possibly the transmission of a reply message can be dependent on the successful execution of tests in N2, Nn. Finally, the transmitter processing unit associated to this transmitter memory after having read this message operates the associated transmitter to transmit the message on the ring, RG2 or RG1 respectively. These node test reply messages NTRM22 and NTRMn1 are received by the receivers R12 and R11 of node N1 and then stored in RM12 and RM11 by RPU12 and RPU11 respectively. Thus they are removed from the rings RG1 and RG2.

Each time a ring test message or a node test reply message is received in one of the receiver memories RM11 and RM12, the main processor MP1 updates its system status register SSR. With regard to the ring test messages it should be noted that the processor MP1 upon receiving such a message knows if it is received on the ring on which it was originally transmitted or not since the ring on which it is received is that associated to the memory RM11, RM12 in which the received message is stored, whilst the ring on which it was transmitted is given by the ring identifier of the message.

If everything is O.K. the ring test messages RTM11 and RTM12 as well as the node test reply messages NTRM21 and NTRMn1 are received in node N1 before the end of the time interval TO2 on the rings RG1, RG2, RG2 and RG1 respectively. This is not so if one or more nodes and/or one or more ring portions between these nodes are faulty. The above mentioned table lists the various possible contents of the SSR which may be found in node N1 at the end of a time interval TO2 following the transmission of the ring test messages RTM11 and RTM12 and of the node test messages NTM11 and NTM12. Hereby X means either N or NTRM22 and Y means either N or NTRMn1.

From the information stored in SSR the main processor MP1 draws the following conclusions with regard to the system status SS:
RG1OK, RG1NOK: ring RG1 is OK, NOK respectively;
RG2OK, RG2NOK: ring RG2 is OK, NOK respectively;
N2D, NnD: adjacent node N2, Nn is not operative or down, e.g. power down. This condition includes the condition of the node N2, Nn and/or the ring portions between N2, Nn and N1;

N2O, NnO: adjacent node N2, Nn is on-line, but not active, e.g. during programme loading;

N2A, NnA: adjacent node N2, Nn is active. This also includes the node N2, Nn and the ring portions between N2, Nn and N1;

NRG1, NRG2: in a node able to be reached from node N1 via RG1, RG2 a loop has been established, between RG1 and RG2 or between RG2 and RG1 respectively.

To take the information of SSR into account the main processor MP1 possibly controls the execution of reconfiguration operations in node N1 by setting to 1 one or more of the bits FSB11, FSB12 and TPB12.

The various cases which may be found in SSR and which are shown in the above table are briefly considered hereinafter.

CASE 0

This is the rest condition where the contents of SSR are: N, N, N, N

CASE 1

RTM11 and RTM12 are received back in N1 on RG1 and RG2 respectively. Independently from the receipt or absence of receipt of NTRM22 or NTRMn1, as indicated by X or Y, the main processor MP1 deduces from this information that in the system both the rings RG1 and RG2 are O.K. and decides therefore that no reconfiguration measures have to be taken. It also sends a message to the maintenance system to inform it of the fact that both the rings are O.K.

CASES 2 AND 3

Either only RTM11 or RTM12 is received back in N1 on RG1 and RG2 respectively. Again independently from the receipt or absence of receipt of the test reply messages, MP1 deduces from this information that in the system either ring RG1 or RG2 is O.K. and decides therefore that no reconfiguration measures have to be taken. It also informs the maintenance system of the fact that ring RG2 or RG1 is not O.K.

CASE 4

RTM11 and RTM12 are received back in N1 on RG2 and RG1 as indicated by RTM'11 and RTM'12 respectively. Independently from the reception or absence of reception of NTRM22 or NTRMn1, as indicated by X or Y, the main processor MP1 deduces from this information that RG1 and RG2 are both interrupted somewhere, e.g. in Z on FIG. 1, but that, as indicated by NRG1 and NRG2 in nodes Nx and Nn−1 (FIG. 1) able to be reached from N1 via RG1 and RG2 loops Lx and Ln−1 have been established between RG1 and RG2 and between RG2 and RG1 respectively so that a new single ring has been formed. Consequently, MP1 then only transmits test messages and sets to 1 the transparency bit TPB12 which makes RG2 in Nn transparent by bringing RPU12 in such a condition that all messages, except node test reply messages, received by R12 are stored in FIFO12 for further transmission by T12 on RG2. Node test reply messages are stored in RM12. Making RG2 transparent in N1 in the case two loops, such as Lx and Ln−1, have been formed is necessary because—as mentioned above—messages may be removed from a ring either by the node which originated the message or by the node of destination. Indeed, suppose that N1 transmits a message on RG1 to Nn−1 then this message will be looped back by Lx to N1 and removed from the ring if no precautions are taken. However, as RG2 is transparent in node N1 this message is immediately transmitted by T12 to Nn and from there to the destination node Nn−1.

CASES 5 TO 8

RTM11 is received back in N1 on RG2, as indicated by RTM'11, and RTM12 is not received back in N1, NTRM22 and NTRMn1 are either received or not.

From this information the main processor MP1 deduces the system status SS as follows :

from the receipt of RTM11 on RG2 it follows that RG1 is interrupted somewhere but that in some node able to be reached via RG1 a loop has been established between RG1 and RG2. This is indicated by NRG1;

from the absence of receipt of RTM12 it follows that RG2 is interrupted somewhere;

from the receipt of NTRM22 or NTRMn1 it follows that N2 or Nn is active. This is indicated by N2A or NnA;

from the absence of receipt of NTRM 22 or NTRMn1 it follows that N2 or Nn is down. This is indicated by N2D or Nnd;

from the above it follows that in case 5 the side of N1 looking in the direction of RG2 is faulty;

in cases 6 and 8 both the sides of N1 are active;

in case 7 both the sides of N1 are not active.

Based on the above detected system status, MP1 decides to set to 1 both FSB11 and FSB12 for the cases 5 and 7 and to do nothing for the cases 6 and 8. By setting FSB11 to 1 a loop is established between R11 and T12, i.e. between RG1 and RG2, whilst by setting FSB12 to 1 a loop is established between R12 and T11, i.e. between RG2 and RG1. The latter loop is required to permit messages received from N2 by R12 to be transmitted back to N2, whilst the former loop enables messages sent by Nn after it is no longer down to be transmitted to N1 and received back therefrom and to prevent such messages from being transmitted by T11.

It should further be noted that cases 6 and 8 are unstable cases because as RG2 is somewhere interrupted a loop will somewhere be formed between RG2 and RG1 in which case also RTM12 will be received on another ring as RTM'12 (see case 4).

CASES 9 TO 12

These cases are similar to the cases 4 to 8, the roles of N2 and Nn being however interchanged. For this reason the system status for the cases 9 to 12 corresponds to the system status for the cases 8, 6, 7, 5 respectively and the same is true for the reconfiguration measures.

CASES 13 TO 16

RTM11 and RTM12 are not received back in N1 and NTRM22 and NTRMn1 are either received or not so that the system status for the cases 13 to 16 is similar to that of cases 5 to 8 respectively, except for NRG1 which now does not form part of the status and for N20 which is replaced by N2D. Also the reconfiguration measures for the cases 13 to 15 are identical to those for the cases 5 to 7. However for case 16, contrary to case 8, both FSB11 and FSB12 are now also set to 1. No messages are sent to the maintenance system.

CASES 17 AND 18

These cases are unstable cases. Indeed, although there exists a correct ring RG1 (case 17) or RG2 (case 18) as indicated by RTM11 or RTM12 respectively, there still exists a loop as indicated by RTM'11 or RTM'12 which has to be opened as it is of no use. This loop was established during the time both rings were faulty.

While the principles of the invention have been described above in connection with specific apparatus, it is to be clearly understood that this description is made only by way of an example and not as a limitation on the scope of the invention.

|  | SSR | | | | | Reconfiguration | Reconfiguration | Maintenance messages |
|---|---|---|---|---|---|---|---|---|
| O | RTM11 N | RTM12 N | NTM11 N | NTM12 N | SS | R12-T11 | R11-T12 | and/or comments |
| 1 | RTM11 | RTM12 | X | Y | RG1OK,RG2OK | — | — | RG1OK RG2OK |
| 2 | RTM11 | N | X | Y | RG1OK | — | — | RG2NOK |
| 3 | N | RTM12 | X | Y | RG2OK | — | — | RG1NOK |
| 4 | RTM'11 | RTM'12 | X | Y | NRG1,NRG2 N2O of N2A, NnO of NnA | — | TPB12-1 | Single ring with transparency |
| 5 | RTM'11 | N | NTRM22 | N | NRG1,N2A,NnD | MSB11-1 | MSB12-1 | — |
| 6 | RTM'11 | N | NTRM22 | NTRMn1 | NRG1,N2A,NnA | — | — | Unstable state |
| 7 | RTM'11 | N | N | N | NRG1,N2O,NnD | MSB11-1 | MSB12-1 | |
| 8 | RTM'11 | N | N | NTRMn1 | NRG1,N2O,NnA | — | — | Unstable state |
| 9 | N | RTM'12 | NTRM22 | N | NRG2,N2A,NnO | — | — | — |
| 10 | N | RTM'12 | NTRM22 | NTRMn1 | NRG2,N2A,NnA | — | — | — |
| 11 | N | RTM'12 | N | N | NRG2,N2D,NnO | MSB11-1 | MSB12-1 | — |
| 12 | N | RTM'12 | N | NTRMn1 | NRG2,N2O,NnA | MSB11-1 | MSB12-1 | — |
| 13 | N | N | NTRM22 | N | N2A,NnD | MSB11-1 | MSB12-1 | — |
| 14 | N | N | NTRM22 | NTRMn1 | N2A,NnA | — | — | — |
| 15 | N | N | N | N | N2D,NnD | MSB11-1 | MSB12-1 | — |
| 16 | N | N | N | NTRMn1 | N2D,NnA | MSB11-1 | MSB12-1 | — |
| 17 | RTM11 | RTM'12 | X | Y | RG1OK,NRG2 | — | — | Unstable state |
| 18 | RTM'11 | RTM12 | X | Y | NRG1,RG2OK | — | — | Unstable state |

We claim:

1. Multiple-ring communication system which includes a plurality of nodes intercoupled in at least two rings and operating on an equal basis without central control, each node including a plurality of message receiver/transmitter equipments associated to distinct ones of said rings respectively, each of said equipments able to receive messages on said associated distinct ring and transmit messages thereon in a direction opposite to other said distinct rings, and processing means for checking the receipt or absence of receipt of signals on the receiver ring portions connecting the receivers of said node to transmitters of its neighbouring nodes and for performing reconfiguration operations in response to the result provided by said checking operation, characterized in that said receiver/transmitter equipments of each said node (N1) are able to transmit on said rings (RG1, RG2) ring test messages (RTM11, RTM12) the destination of which is said node (N1) itself, said processing means (MP1, MEM1) controlling said receiver/transmitter equipments of said node and being able to check the receipt or absence of receipt of said ring test messages prior to possibly executing said reconfiguration operations.

2. Multiple-ring communication system according to claim 1, characterized in that said receiver/transmitter equipment of each said node (N1) are also able to transmit on said rings (RG1, RG2) neighbouring node test messages (NTM11, NTM12) which upon receipt by receiver/transmitter equipments of said neighbouring nodes (N2, Nn) normally give rise to the transmission to said node of node test reply messages (NTRM22, NTRMn1) on rings different from those on which said neighbouring node test messages were transmitted, said processing means (MP1, MEM1) being also able to check the receipt or absence of receipt of said test reply messages prior to possibly executing said reconfiguration operations.

3. Multiple-ring commnication system according to claim 2, characterized in that each of said message receiver/transmitter equipments (R11, RPU11, RM11, FIFO11, TPU11, SW11, T11, TM11; R12, RPU12, RM12, FIFO12, TPU12, SW12, T12, TM112) includes receiver means (R11, RPU11, R12, RPU12), transmitter means (TPU11, T11, SW11, TPU12, T12, SW12), a delay buffer (FIFO11, FIFO12), an input buffer (RM11, RM12) and an output buffer (TM11, TM12), said receiver means having an input coupled to a respective ring (RG1, RG2) and outputs coupled to inputs of said input and delay buffers and said delay and output buffers having access to said transmitter means, said output buffer having an input coupled to a bus (BB1) and said transmitter means having an output having access to said ring, and said processing means (MP1, MEM1) being coupled to said bus which is common to both said receiver/transmitter equipments.

4. Multiple-ring communication system according to claim 3, characterized in that said transmitter means (TPU11, T11, SW11, TPU12, T12, SW12) of each of said receiver/transmitter equipments including a transmitter circuit (T11, T12), an associated transmitter processing circuit (TPU11, TPU12) and an associated switching means (SW11; SW12) controlled by said processing means (MP, MEM1), said delay (FIFO11; FIFO12 FIFO12) and output (TM11; TM12) buffers being coupled to said transmitter processing circuits and each of said transmitter processing circuits (TPU11; TPU12) being coupled to both said transmitter circuits (T11, T12) via said associated switching means (SW11, SW12), and said processing means (MP1, MEM1) controlling said switching means (SW11, SW12) in such a way that each of said transmitter processing circuits (TPU11, TPU12) can be effectively connected to either one of said transmitter circuits (T11, T12).

5. Double-ring communication system according to claim 4, characterized in that each of said switching means (SW11;SW12) is a two-input-one-output digital multiplexer with two inputs coupled to the outputs of said transmitter processing circuits (TPU11, TPU12), with an output coupled to the input of a distinct one of said transmitter circuits (T11, T12), and with a select input controlled by a first bit (FSB12; FSB11) able to be activated or de-activated by said processing means (MP1; MEM1) in order to effectively connect the one or the other of said two inputs to said one output and to establish a loop or not between said rings.

6. Multiple-ring communication system according to claim 2, characterized in that said receiver means (R11, RPU11, R12, RPU12) of each of said receiver/transmitter equipments includes a receiver circuit (R11, R12) and an associated receiver processing circuit (RPU11; RPU12), at least one (RPU12) of said receiver processing circuits (RPU11; RPU12) being able to be brought in such a condition by said processing means that it is only able to store received node test reply messages (NTM22) in its associated said input buffer (RM12).

7. Multiple-ring communication system according to claim 6, characterized in that said one receiver processing circuit (RPU12) is controlled by a second bit (TPB12) able to be activated by said processing means (MP1 MEM1) to bring said one receiver processing circuit in said condition wherein it is only able to store received node test reply messages in its associated input buffer.

8. Multiple-ring communication system according to claim 7, characterized in that when said second bit (TPB12) has been activated by said processing means (MP1, MEM1) the latter means still control the transmission of said ring test and node test messages.

9. Multiple-ring communication system according to claim 1, characterized in that each of said test messages includes at least an indication of the type of message (RTM, NTM, NTRM), a source node address indicating the node originating the message, and a ring identifier identifying the ring on which the message is transmitted.

10. Multiple-ring communication system according to claim 9, characterized in that said ring test message also includes the address of the node of destination, this address being equal to the source node address.

11. Multiple-ring communication system according to claim 9, characterized in that said neighbouring node test message includes an indication that a node test reply message has to be transmitted on a predetermined ring, but does not include the address of a node of destination.

12. Multiple-ring communication system according to claim 11, characterized in that said neighbouring node test message includes an indication that a test has to be performed in the node and that a node test reply message has only to be transmitted when this test has been successful.

13. Multiple-ring communication system according to claim 3, characterized in that in each node (N1) said processing means (MP1, MEM1) are able to regularly (TO2) control the transmission by said receiver/transmitter equipments of said ring test messages (RTM11, RTM12) and of said neighbouring nodes test messages (NTM11, NTM12), to store in a register (SSR) the status of the system by storing therein the receipt of said ring test messages and of said neighbouring nodes test reply messages (NTRM22, NTRMn1) as well as the fact that said ring test messages are received on the same ring or on a different ring than that on which they were transmitted, said fact being derived from the identity of said input buffer (RM11, RM12) in which a said ring test message is stored by said receiver means (R11, RPU11; R12; RPU12) and from said ring identifier of said ring test message, and to regularly (TO2) evaluate the system status from the thus registered status information and perform said reconfiguration operations (FSB11, FSB12, TPB12) in function of said system status.

14. Multiple-ring communication system according to claim 13, characterized in that one of said reconfiguration operations consists in activating at least one of said first bits (FSB11, FSB12) so as to establish a loop between said rings.

15. Multiple-ring communication system according to claim 14, characterized in that both said first bits (FSB11, FSB12) are activated when said registered status information (SSR, cases 5, 7, 11, 12) indicates that a ring test message transmitted on a ring has been received on another ring, and that no ring test message and no neighbouring node test reply message have been received on said one ring.

16. Multiple-ring communication system according to claim 14, characterized in that said first bits (FSB11, FSB12) are both activated when said registered status information (SSR, cases 13, 15, 16) indicates that no ring test messages and only one neighbouring node test reply meessage have been received.

17. Multiple-ring communication system according to claim 1, characterized in that said receiver means (RPU11, R11; RPU12, R12) of a node (N1) are able to store a received message in said input buffer (RM11, RM12) when the address of the source node or of the destination node corresponds to that of said node (N1).

18. Multiple-ring communication system according to claim 13, characterized in that another one of said reconfiguration operations consists in activating said second bit (TPB12) when said registered status information (SSR, case 4) indicates that both said ring test messages have been received on different rings than those on which they were transmitted.

* * * * *